United States Patent
Tang (10) Patent No.: US 9,469,825 B2
(45) Date of Patent: Oct. 18, 2016

(54) LUBRICANT COMPOSITION FOR AUTOMATIC TRANSMISSIONS

(71) Applicant: Afton Chemical Corporation, Richmond, VA (US)

(72) Inventor: Tom Hong-Zhi Tang, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 14/656,008

(22) Filed: Mar. 12, 2015

(65) Prior Publication Data

US 2016/0264906 A1    Sep. 15, 2016

(51) Int. Cl.
  *C10M 161/00*   (2006.01)
  *F16H 57/04*    (2010.01)
  *C10M 133/16*   (2006.01)
  *C10M 133/56*   (2006.01)

(52) U.S. Cl.
  CPC ........ *C10M 161/00* (2013.01); *F16H 57/0461* (2013.01); *F16H 57/0473* (2013.01); *C10M 133/16* (2013.01); *C10M 133/56* (2013.01); *C10M 2215/086* (2013.01); *C10M 2215/28* (2013.01)

(58) Field of Classification Search
  CPC ............ C10M 133/16; C10M 133/56; C10M 2215/086; C10M 2215/28; C10M 161/00; F16H 57/0461; F16H 57/0473
  See application file for complete search history.

(56) References Cited

U.S. PATENT DOCUMENTS

| | | | |
|---|---|---|---|
| 5,578,236 A * | 11/1996 | Srinivasan et al. | 508/188 |
| 6,451,745 B1 | 9/2002 | Ward | |
| 2006/0063685 A1 | 3/2006 | Purmer et al. | |
| 2009/0233822 A1 | 9/2009 | Iyer | |
| 2009/0233823 A1 | 9/2009 | Fahl et al. | |
| 2013/0008756 A1 | 1/2013 | Noles, Jr. et al. | |
| 2014/0097059 A1 | 4/2014 | Tang et al. | |

FOREIGN PATENT DOCUMENTS

| | | | |
|---|---|---|---|
| EP | 0 894 845 | | 2/1999 |
| EP | 1 233 054 | | 8/2002 |
| EP | 1233054 | A1 * | 8/2002 |
| EP | 1529831 | A2 | 5/2005 |
| EP | 0 856 042 | | 12/2011 |
| EP | 1 262 538 | | 11/2014 |

OTHER PUBLICATIONS

International Search Report for EP16159753.9, dated Jun. 2, 2016.

* cited by examiner

*Primary Examiner* — Taiwo Oladapo
(74) *Attorney, Agent, or Firm* — Honigman Miller Scwhartz and Cohn LLP; Jeffrey A. Chelstrom; Jonathan P. O'Brien (57) ABSTRACT

A transmission lubricant composition, a method of lubricating a machine part, and a transmission are provided that utilize select boronated and phosphorylated N-substituted polyisobutylene succinimide dispersants combined with metal containing detergents to achieve high friction durability and low wear rates for automatic transmissions.

18 Claims, 1 Drawing Sheet

LUBRICANT COMPOSITION FOR AUTOMATIC TRANSMISSIONS

FIELD

The disclosure generally relates to automatic transmission lubricants, methods of using such lubricants, and transmissions with a wet-clutch friction disk including the lubricants. More particularly, the disclosure relates to select boronated and phosphorylated transmission lubricant compositions with high levels of dynamic friction, increased friction durability, and low wear rates.

BACKGROUND

The continuing pursuit of more fuel efficient vehicles is requiring automatic transmissions to be more robust and energy efficient. There are a number of types of automatic transmission including stepped automatic transmissions, automated manual transmissions, continuously variable transmissions and dual clutch transmissions. Each type of automatic transmission offers some advantages over the others when used in vehicles; however, the ability to reduce size and weight while maintaining desired transmission characteristics provides a benefit regardless of type. In any automatic transmission where a fluid lubricated clutch is used (e.g. stepped automatic transmissions, continuously variable transmissions and dual clutch transmissions), increasing the friction level in the clutch has the desirable effect of increasing the level of torque that can be transferred through the clutch which, in turn, requires less surface area to transmit the same amount of torque.

However, different transmissions tend to have differing demands on a lubricant for optimal performance. For example, gear oil often requires good extreme pressure and load-bearing properties, generally low boundary friction and low thin film friction. On the other hand, a lubricant for continuously variable transmissions (CVT) tends to require low boundary friction and high thin film friction. Automatic transmissions with wet clutches, in contrast, usually require high boundary friction for an optimal torque transfer and low thin film friction to efficiently pump fluid through the transmission.

In many instances, a particular focus of automatic transmission fluids (ATF) is the minimization of shudder (that is, anti-shudder properties), which is believed to be a function of the change of friction coefficient with time ($d\mu/dt<0$). Furthermore, shift characteristics of automatic transmissions are primarily dependent on the frictional characteristics of the ATF. The ATF fluid typically needs to have a high and stable frictional performance over the life of the fluid, good anti-shudder performance, and anti-wear characteristics. These characteristics are often a challenge to balance with the requirement that today's ATF lubricant compositions also need to maximize service intervals, or even better, avoid oil service during the lifetime of the equipment. This is referred to in the industry as a lifetime fill or "fill-for-life" fluid. Therefore, maintenance of the friction properties of an ATF over time, i.e. friction durability, may also be a desired property of the fluid.

Several prior efforts at improving the friction properties of ATF fluids have been attempted, but many involve the addition of or increased levels of lubricant components such as friction modifiers, oxidization modifiers, and/or viscosity modifiers. The addition of or increased levels of components escalates manufacturing complexity and increases product costs. Moreover, adding or increasing the level of friction modifies in the context of automatic transmission fluid may be undesired because it may compromise other important fluid characteristics. For instance, added or increased levels of friction and/or viscosity modifiers tend to drop static friction to levels resulting in unacceptable loss of torque transmission, which can be undesired in automatic transmissions, such as those including wet-clutch friction discs.

SUMMARY

The present disclosure describes a transmission lubricant composition, a method of lubricating a machine part using such lubricant composition, and a transmission including the lubricant composition that provides a high and stable dynamic friction, excellent anti-shudder performance, and low wear rates in automatic transmissions, such as a dual-clutch transmission.

In one aspect or embodiment of the present disclosure, the transmission lubricant composition includes a major amount of a base or lubricating oil, a select boronated and phosphorylated N-substituted polyisobutylene succinimide dispersant, and a select metal containing detergent. The lubricant composition has about 4.5 to about 25 weight percent of the boronated and phosphorylated N-substituted polyisobutylene succinimide dispersant, which has a number average molecular weight of the polyisobutylene greater than about 1300 to about 2300 as determined by gel permeation chromatography using polystyrene as the reference and a viscosity of the polyisobutylene at 100° C. of about 2100 to about 2700 cSt. The dispersant also has about 44 to about 371 ppm boron, a ratio of boron to phosphorus of about 0.21 to about 0.46, and a ratio of boron to nitrogen of about 0.09 to about 0.19. The metal containing detergent provides less than about 455 ppm of metal to the lubricant composition and delivers a soap content of about 0.02 to about 0.15 weight percent to the lubricant composition. As discussed further herein and in the Examples, this specific lubricant composition unexpectedly provides a robust lubricant that exhibits high friction durability, high dynamic friction and low wear rates all at the same time while including conventional levels of friction and viscosity modifiers in the lubricant.

In other aspects or embodiments, which can be combined with those of the previous paragraph, the transmission lubricant composition has a Brookfield viscosity at −40° C. of not more than about 15,000 cP; the lubricating oil is selected from mineral oil and synthetic oil; the major amount of a lubricating oil is selected from the group consisting of a Group II base oil, a Group III base oil and/or a Group IV base oil as well as mixtures thereof; the transmission lubricant composition includes about 4.5 to about 12 weight percent of the boronated and phosphorylated N-substituted polyisobutylene succinimide dispersant (in other approaches, about 4.5 to about 7.7 weight percent); the detergent is a neutral to overbased sulfonate, phenate, or carboxylate with an alkali metal or alkaline earth metal salt; the detergent is a linear or branched sulfonate; the metal containing detergent includes about 0 to about 281 ppm of the metal; the lubricant composition includes about 0.08 to about 1 weight percent of the metal containing detergent; and/or the metal containing detergent is not boronated.

In yet other aspects or embodiments, which can be combined with any of those in the two previous paragraphs, the transmission lubricant composition further includes at least one component selected from the group consisting of a friction modifier, an air expulsion additive, an antioxidant, a corrosion inhibitor, a foam inhibitor, a metallic detergent, a seal-swell agent, a viscosity index improver, anti-rust agent, an extreme pressure additive, and mixtures thereof.

The present disclosure also describes a method of lubricating a machine part by supplying thereto a lubricant composition including a mixture of a major amount of a lubricating oil and about 4.5 to about 25 weight percent of a boronated and phosphorylated N-substituted polyisobutylene succinimide dispersant having a number average molecular weight of the polyisobutylene greater than about 1300 to about 2300 as determined by gel permeation chromatography using polystyrene as the reference and a viscosity of the polyisobutylene at 100° C. of about 2100 to about 2700 cST, about 44 to about 371 ppm boron, a ratio of boron to phosphorus of about 0.21 to about 0.46, and a ratio of boron to nitrogen of about 0.09 to about 0.19. The lubricant composition also includes a metal containing detergent providing less than about 455 ppm of a metal to the lubricant composition and delivering a soap content of about 0.02 to about 0.15 weight percent to the lubricant composition.

In other aspects or embodiments of the methods herein, which can be combined with those of the previous paragraph, the lubricant used in the method has a Brookfield viscosity at −40° C. of not more than about 15,000 cP; the lubricating oil is selected from mineral oil and synthetic oil; the major amount of a lubricating oil is selected from the group consisting of a Group II base oil, a Group III base oil and/or a Group IV base oil as well as mixtures thereof; the transmission lubricant composition includes about 4.5 to about 12 weight percent of the boronated and phosphorylated N-substituted polyisobutylene succinimide dispersant (in other approaches, about 4.5 to about 7.7 weight percent); the detergent is a neutral to overbased sulfonate, phenate, or carboxylate with an alkali metal or alkaline earth metal salt; the detergent is a linear or branched sulfonate; the metal containing detergent includes about 0 to about 281 ppm of the metal; the lubricant composition includes about 0.08 to about 1 weight percent of the metal containing detergent; and/or the metal containing detergent is not boronated.

In yet other aspects or embodiments of the methods herein, which can be combined with any of those in the two previous paragraphs, the lubricant used in the methods may further includes at least one component selected from the group consisting of a friction modifier, an air expulsion additive, an antioxidant, a corrosion inhibitor, a foam inhibitor, a metallic detergent, a seal-swell agent, a viscosity index improver, anti-rust agent, an extreme pressure additive, and mixtures thereof.

The present disclosure also describes a transmission including a wet-clutch friction disk and a lubricating composition. The lubricating composition includes a major amount of a lubricating oil and about 4.5 to about 25 weight percent of a boronated and phosphorylated N-substituted polyisobutylene succinimide dispersant having a number average molecular weight of the polyisobutylene greater than about 1300 to about 2300 as determined by gel permeation chromatography using polystyrene as the reference and a viscosity of the polyisobutylene at 100° C. of about 2100 to about 2700 cST, about 44 to about 371 ppm boron, a ratio of boron to phosphorus of about 0.21 to about 0.46, and a ratio of boron to nitrogen of about 0.09 to about 0.19. The lubricant of the transmission also includes a metal containing detergent providing less than about 455 ppm of a metal to the lubricant composition and delivering a soap content of about 0.02 to about 0.15 weight percent to the lubricant composition.

In other aspects or embodiments of the transmission, which can be combined with those of the previous paragraph, the lubricant used in the transmission has a Brookfield viscosity at −40° C. of not more than about 15,000 cP; the lubricating oil is selected from mineral oil and synthetic oil; the major amount of a lubricating oil is selected from the group consisting of a Group II base oil, a Group III base oil and/or a Group IV base oil as well as mixtures thereof; the transmission lubricant composition includes about 4.5 to about 12 weight percent of the boronated and phosphorylated N-substituted polyisobutylene succinimide dispersant (in other approaches, about 4.5 to about 7.7 weight percent); the detergent is a neutral to overbased sulfonate, phenate, or carboxylate with an alkali metal or alkaline earth metal salt; the detergent is a linear or branched sulfonate; the metal containing detergent includes about 0 to about 281 ppm of the metal; the lubricant composition includes about 0.08 to about 1 weight percent of the metal containing detergent; and/or the metal containing detergent is not boronated.

In yet other aspects or embodiments of the transmission, which can be combined with any of these in the two previous paragraphs, the lubricant used in the transmission may further includes at least one component selected from the group consisting of a friction modifier, an air expulsion additive, an antioxidant, a corrosion inhibitor, a foam inhibitor, a seal-swell agent, a viscosity index improver, anti-rust agent, an extreme pressure additive, and mixtures thereof.

The transmission described in the previous paragraphs may a dual-clutch transmission.

DETAILED DESCRIPTION

Transmission lubricants are described that provide improved friction properties and friction durability over the life of the fluid. The lubricants are particularly suited for automatic transmissions, such as but not limited to, dual clutch transmissions with a wet-clutch friction disc. The lubricants herein provide high and stable dynamic friction, good anti-shudder characteristics, and anti-wear performance all at the same time. Such results were obtained not by increasing the levels of friction or viscosity modifiers, but by discovering critical interactions between select lubricant dispersant and detergent parameters that were not previously expected to affect friction properties in such a dramatic fashion within transmission lubricants. Friction properties can be measured using a SAE #2 test rig or standard FZG anti-wear tests as described more fully herein.

In one aspect, the lubricants include a major amount of a base or lubricating oil(s), select amounts of a specific boronated and phosphorylated N-substituted polyisobutylene succinimide dispersant(s), and a select metal containing detergent(s). It was discovered that to achieve desired friction properties, desired friction durability, and good anti-wear performance all at the same time, critical interactions between multiple parameters of the dispersant and the detergent need to be met at the same time. For example, the dispersant is a boronated and phosphorylated N-substituted polyisobutylene (FIB) succinimide dispersant having a treat rate in the lubricant of about 4.5 to about 25 weight percent with specific parameters of the PIB substituent and select relationships of the nitrogen, boron, and phosphorous. For instance, the PIB substituent has a number average molecular weight greater than about 1300 to about 2300 as determined by gel permeation chromatography using polystyrene as the reference and a viscosity of the PIB at 100° C. of about 2100 to about 2700 cSt. The dispersant also has about 44 to about 371 ppm boron, a ratio of boron to phosphorus of about 0.21 to about 0.46, and a ratio of boron to nitrogen of about 0.09 to about 0.19. Not only are these select characteristics of the dispersant critical, but the detergent must also provide less than about 455 ppm of metal and deliver a soap content to the lubricant of about 0.02 to about 0.15 weight percent. Deviation of any one of these critical components of either the dispersant or the detergent results in a lubricant composition that fails one of friction performance, friction durability, anti-wear properties, or combinations thereof. It was unexpected that the criticality of dispersant and detergent selection would so dramatically affect performance of the lubricant in the context of a transmission lubrication fluid.

As used herein, the terms "oil composition," "lubrication composition," "lubricating oil composition," "lubricating oil," "lubricant composition," "fully formulated lubricant composition," and "lubricant" are considered synonymous, fully interchangeable terminology referring to the finished lubrication product comprising a major amount of a base or lubricating oil plus minor amounts of the select dispersants and detergents noted herein. The lubricant may also include optional additives as further described below. In some approaches, the Brookfield viscosity at −40° C. for these lubricant compositions is typically not more than about 15,000 cP and, in some approaches, between about 8,000 and about 15,000 cP using ASTM-2983. In other approaches, a kinematic viscosity at 100° C. for these lubricants ranges from about 5.9 to about 7.0 cSt. The lubricants herein with about 4.5 to about 12 percent dispersant exhibit such viscosities. In other instances, with higher treat rates of the disclosed dispersant (e.g., about 20 to about 25 percent and, in other cases, about 23 to about 25 percent), the Brookfield viscosity at −40° C. may approach 72,500 cP and the kinematic viscosity at 100° C. may approach about 14 cSt.

Base or Lubricating Oil

As used herein, the term "base oil" or "lubricating oil" generally refers to oils categorized by the American Petroleum Institute (API) category groups Group I-V oils as well as animal oils, vegetable oils (e.g. castor oil and lard oil), petroleum oils, mineral oils, synthetic oils, and oils derived from coal or shale. The American Petroleum Institute has categorized these different basestock types as follows: Group I, greater than 0.03 wt percent sulfur, and/or less than 90 vol percent saturates, viscosity index between 80 and 120; Group II, less than or equal to 0.03 wt percent sulfur, and greater than or equal to 90 vol percent saturates, viscosity index between 80 and 120; Group III, less than or equal to 0.03 wt percent sulfur, and greater than or equal to 90 vol percent saturates, viscosity index greater than 120; Group IV, all polyalphaolefins. Hydrotreated basestocks and catalytically dewaxed basestocks, because of their low sulfur and aromatics content, generally fall into the Group II and Group III categories. Polyalphaolefins (Group IV basestocks) are synthetic base oils prepared from various alpha olefins and are substantially free of sulfur and aromatics.

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may sometimes be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source with or without little further purification treatment. Refined oils are similar to unrefined oils except that they have been treated by one or more purification steps, which may result in the improvement of one or more properties. Examples of suitable purification techniques are solvent extraction, secondary distillation, acid or base extraction, filtration, percolation, and the like. Oils refined to the quality of an edible oil may or may not be useful. Edible oils may also be called white oils. In some embodiments, lubricant compositions are free of edible or white oils.

Re-refined oils are also known as reclaimed or reprocessed oils. These oils are obtained in a manner similar to that used to obtain refined oils using the same or similar processes. Often these oils are additionally processed by techniques directed to removal of spent additives and oil breakdown products.

Mineral oils may include oils obtained by drilling, or from plants and animals and mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully-hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In an embodiment, oils may be prepared by a Fischer-Tropsch gas-to-liquid synthetic procedure as well as from other gas-to-liquid oils.

The amount of the base or lubricating oil present may be the balance remaining after subtracting from 100 wt % the sum of the amounts of the specific dispersants and detergent noted herein as well as any further optional performance additives also noted herein. For example, the base or lubricating oil that may be present in a finished fluid may be a major amount, such as greater than about 50 wt. %, greater than about 60 wt. %, greater than about 70 wt. %, greater than about 80 wt. %, greater than about 85 wt. %, or greater than about 90 wt. %.

Dispersant

The lubricant composition includes one or more select dispersants or mixtures thereof. Dispersants are often known as ashless-type dispersants because, prior to mixing in a lubricating oil composition, they do not contain ash-forming metals and they do not normally contribute any ash when added to a lubricant. Ashless-type dispersants are characterized by a polar group attached to a relatively high molecular weight hydrocarbon chain. Specific ashless dispersants discovered for the present disclosure include boronated and phosphorylated N-substituted long chain alkenyl succinimides.

The N-substituted long chain alkenyl succinimides include polyisobutylene (FIB) substituents with a number average molecular weight of the polyisobutylene substituent in a range of about 1300 to about 2300 as determined by gel permeation chromatography (GPC) using polystyrene (with a number average molecular weight of 180 to about 18,000) as the calibration reference. The PIB substituent used in the dispersant also has a viscosity at 100° C. of about 2100 to about 2700 cSt as determined using ASTM D445. Succinimide dispersants and their preparation are disclosed, for instance in U.S. Pat. No. 7,897,696 and U.S. Pat. No. 4,234,435, which are incorporated herein by reference. Succinimide dispersants are typically an imide formed from a polyamine, typically a poly(ethyleneamine). The dispersants typically include two succinimide moieties joined by a polyamine. The polyamine may be tetra ethylene penta amine (TEPA), tri ethylene tetra amine (TETA), penta ethylene hexa amine (PEHA), other higher nitrogen ethylene diamine species and/or mixtures thereof. The polyamines may be mixtures of linear, branched and cyclic amines. The PIB substituents may be joined to each succinimide moiety.

The N-substituted polyisobutylene succinimides dispersants herein are also boronated and phosphorylated in order to achieve the desired friction properties. These dispersants are generally the reaction products of i) at least one phosphorus compound and/or a boron compound and ii) at least one ashless dispersant. The boron and phosphorus need to be provided in select amounts and within key ratios to each other and to the level of nitrogen in the dispersant to achieve the desired friction properties while using conventional levels of friction and/or viscosity modifiers. By one approach, the dispersant includes about 44 to about 371 ppm boron, a ratio of boron to phosphorus of about 0.21 to about 0.46, and a ratio of boron to nitrogen of about 0.09 to about 0.19. Deviation from these parameters results in one or more failures of the friction characteristics as discussed more in the Examples.

Suitable boron compounds useful in forming the dispersants herein include any boron compound or mixtures of boron compounds capable of introducing boron-containing species into the ashless dispersant. Any boron compound, organic or inorganic, capable of undergoing such reaction can be used. Accordingly, use can be made of boron oxide, boron oxide hydrate, boron trifluoride, boron tribromide, boron trichloride, $HBF_4$ boron acids such as boronic acid (e.g. alkyl-$B(OH)_2$ or aryl-$B(OH)_2$), boric acid, (i.e., $H_3BO_3$), tetraboric acid (i.e., $H_2B_5O_7$), metaboric acid (i.e., $HBO_2$), ammonium salts of such boron acids, and esters of such boron acids. The use of complexes of a boron trihalide with ethers, organic acids, inorganic acids, or hydrocarbons is a convenient means of introducing the boron reactant into the reaction mixture. Such complexes are known and are exemplified by boron trifluoride-diethyl ether, boron trifluoride-phenol, boron trifluoride-phosphoric acid, boron trichloride-chloroacetic acid, boron tribromide-dioxane, and boron trifluoride-methyl ethyl ether.

Suitable phosphorus compounds for forming the dispersants herein include phosphorus compounds or mixtures of phosphorus compounds capable of introducing a phosphorus-containing species into the ashless dispersant. Any phosphorus compound, organic or inorganic, capable of undergoing such reaction can thus be used. Accordingly, use can be made of such inorganic phosphorus compounds as the inorganic phosphorus acids, and the inorganic phosphorus oxides, including their hydrates. Typical organic phosphorus compounds include full and partial esters of phosphorus acids, such as the mono-, di-, and tri esters of phosphoric acid, thiophosphoric acid, dithiophosphoric acid, trithiophosphoric acid and tetrathiophosphoric acid; the mono-, di-, and tri esters of phosphorous acid, thiophosphorous acid, dithiophosphorous acid and trithiophosphorous acid; the trihydrocarbyl phosphine oxides: the trihydrocarbyl phosphine, sulfides; the mono- and dihydrocarbyl phosphonates, (RPO(OR')(OR'') where R and R' are hydrocarbyl and R'' is a hydrogen atom or a hydrocarbyl group), and their mono-, di- and trithio analogs; the mono- and dihydrocarbyl phosphonites, (RP(OR')(OR'') where R and R' are hydrocarbyl and R'' is a hydrogen atom or a hydrocarbyl group) and their mono- and dithio analogs; and the like. Thus, use can be made of such compounds as, for example, phosphorous acid ($H_3PO_3$, sometimes depicted as $H_2(HPO_3)$, and sometimes called ortho-phosphorous acid or phosphonic acid), phosphoric acid ($H_3PO_4$, sometimes called orthophosphoric acid), hypophosphoric acid ($H_4P_2O_6$), metaphosphoric acid ($HPO_3$), pyrophosphoric acid ($H_4P_2O_7$), hypophosphorous acid ($H_3PO_2$, sometimes called phosphinic acid), pyrophosphorous acid ($H_4P_2O_5$, sometimes called pyrophosphonic acid), phosphinous acid ($H_3PO$), tripolyphosphoric acid ($H_5P_3O_{10}$), tetrapolyphosphoric acid ($H_5P_4O_{13}$), trimetaphosphoric acid ($H_3P_3O_9$), phosphorus trioxide, phosphorus tetraoxide, phosphorus pentoxide, and the like. Partial or total sulfur analogs such as phosphorotetrathioic acid ($H_3PS_4$), phosphoromonothioic acid ($H_3PO_3S$), phosphorodithioic acid ($H_3PO_2S_2$), phosphorotrithioic acid ($H_3POS_3$), phosphorus sesquisulfide, phosphorus heptasulfide, and phosphorus pentasulfide ($P_2S_5$, sometimes referred to as $P_4S_{10}$) can also be used in forming dispersants for this disclosure. Also usable, though less preferred, are the inorganic phosphorus halide compounds such as $PCl_3$, $PBr_3$, $POCl_3$, $PSCl_3$, etc.

Likewise use can be made of such organic phosphorus compounds as mono-, di-, and triesters of phosphoric acid (e.g., trihydrocarbyl phosphates, dihydrocarbyl monoacid phosphates, monohydrocarbyl diacid phosphates, and mixtures thereof), mono-, di-, and triesters of phosphorous acid (e.g., trihydrocarbyl phosphites, dihydrocarbyl hydrogen phosphites, hydrocarbyl diacid phosphites, and mixtures thereof), esters of phosphonic acids (both "primary", RP(O)(OR)$_2$, and "secondary". R$_2$P(O)(OR)), esters of phosphinic acids, phosphonyl halides (e.g., RP(O)Cl$_2$ and R$_2$P(O)Cl), halophosphites (e.g., (RO)PCl$_2$ and (RO)$_2$PCl), halophosphates (e.g., ROP(O)Cl$_2$ and (RO)$_2$P(O)Cl), tertiary pyrophosphate esters (e.g., (RO)$_2$P(O)—O—P(O)(OR)$_2$), and the total or partial sulfur analogs of any of the foregoing organic phosphorus compounds, and the like wherein each hydrocarbyl group contains up to about 100 carbon atoms, preferably up to about 50 carbon atoms, more preferably up to about 24 carbon atoms, and most preferably up to about 12 carbon atoms. Also usable, although less preferred, are the halophosphine halides (e.g., hydrocarbyl phosphorus tetrahalides, dihydrocarbyl phosphorus trihalides, and trihydrocarbyl phosphorus dihalides), and the halophosphines (monohalophosphines and dihalophosphines).

The lubricants herein may include mixtures of one or more boronated and phosphorylated dispersants set forth above combined with non-boronated and non-phosphorylated dispersants as long as the called for dispersant requirements set forth above are still met in the lubricant.

Treat rates of the dispersant in the lubricant are also carefully controlled to achieve desired results. Typically, the dispersants described above are provided in about 4.5 to about 25 weight percent and, in other approaches, about 4.5 to about 12 weight percent, and in yet other approaches, about 4.5 to about 7.7 weight percent in the lubricant.

Detergent

The lubricant composition also includes one or more select detergents or mixtures thereof to provide specific amounts of metal and soap content to the lubricating composition. By one approach, the detergent is a metal containing detergent, such as neutral to overbased detergents. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds and methylene bridged phenols. Suitable detergents and their methods of preparation are described in greater detail in numerous patent publications, including U.S. Pat. No. 7,732,390, and references cited therein. In one approach, the detergents are neutral to overbased sulfonates, phenates, or carboxylates with an alkali metal or alkaline earth metal salt. The detergents may be linear or branched, such as linear or branched sulfonates. Linear detergents are those that include a straight chain with no side chains attached thereto and typically include carbon atoms bonded only to one or two other carbon atoms. Branched detergents are those with one or more side chains attached to the molecule's backbone and may include carbon atoms bonded to one, two, three, or four other carbon atoms. In one embodiment the sulfonate detergent may be a predominantly linear alkylbenzenesulfonate detergent. In some embodiments the linear alkyl (or hydrocarbyl) group may be attached to the benzene ring anywhere along the linear chain of the alkyl group, but often in the 2, 3, or 4 position of the linear chain, and in some instances predominantly in the 2 position. In other embodiments, the alkyl (or hydrocarbyl) group may be branched, that is, formed from a branched olefin such as propylene or 1-butene or isobutene. Sulfonate detergents having a mixture of linear and branched alkyl groups may also be used.

The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being one of benzyl, tolyl, and xylyl.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol. In general, the terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, the MR, is greater than one. Such salts are commonly referred to as overbased, hyperbased, or superbased salts and may be salts of organic sulfur acids, carboxylic acids, or phenols. The detergents may also exhibit a total base number (TBN) of about 27 to about 307 and, in other approaches, about 200 to about 307.

The detergent provides less than about 455 ppm of the metal to the lubricant composition. Higher levels of metal result in failures in one or more of the friction durability or wear tests set forth herein. In other approaches, the detergent provides about 0 to about 281 ppm of metal. In yet other approaches, the detergent provides about 0 to about 100 ppm metal to the lubricant composition.

The detergent also provides select levels of soap content to the lubricant composition and the provided soap amounts are balanced with the level of metal such that if the metal is not within the desired ranges, then increasing soap content does not achieve desired results, which is discussed in more detail in the Examples herein. By one approach, the detergent provides about 0.02 to about 0.15 percent soap content to the final lubricating composition, such as sulfonate soap, phenate soap, and/or carboxylate soap. In other approaches, the detergent provides about 0.02 to about 0.1 percent soap, and in yet other approaches, about 0.02 to about 0.05 percent soap.

Soap content generally refers to the amount of neutral organic acid salt and reflects a detergent's cleansing ability, or detergency, and dirt suspending ability. The soap content can be determined by the following formula, using an exemplary calcium sulfonate detergent (represented by $RSO_3)_vCa_w(CO_3)_x(Oh)_y$, with v, w, x, and y denoting the number of sulfonate groups, the number of calcium atoms, the number of carbonate groups, and the number of hydroxyl groups respectively):

$$\text{soap content} = \frac{\text{formula weight of } [(RSO_3)_2Ca]}{\text{effective formula weight}} \times 100$$

Effective formula weight is the combined weight of all the atoms that make up the formula $(RSO_3)_vCa_w(CO_3)_x(OH)_y$, plus that of any other lubricant components. Further discussion on determining soap content can be found in FUELS AND LUBRICANTS HANDBOOK, TECHNOLOGY, PROPERTIES, PERFORMANCE, AND TESTING, George Totten, editor, ASTM International, 2003, relevant portions thereof incorporated herein by reference.

The treat rates of the detergent may be about 0.08 weight percent to about 1 weight percent based on the total weight of the lubricant composition. In some approaches, the metal containing detergent is not boronated such that the boron in the lubricant is solely provided by the dispersant.

The selection of the dispersant and detergents noted above are critical to achieving desired friction properties of the lubricant while using conventional levels of other performance additives, such as friction and viscosity modifiers. In order to achieve lubricant performance for an automatic transmission, and in particular a dual-clutch transmission, the lubricants need to achieve a minimum dynamic friction, a certain friction durability, and low anti-wear rates all at the same time. As noted above, these properties are achieved not by increasing the levels of or varying the levels of viscosity or friction modifiers, but balancing multiple discovered characteristics of the dispersant and detergent at the same time. Minimum dynamic friction and friction durability can be measured using a SAE No. 2 wet friction rig and a modified test based on JASO M348:2002 as described more fully in the Examples. The SAE No. 2 friction test is a stop time controlled, high energy launch friction test. A clutch is submerged in a temperature controlled lubricant oil bath with a circulation pumping moving the batch oil through the clutch interface. The clutch applies a force level at a fixed initial level and then automatically adjusts to control stop time as system performance changes. Data is acquired showing the changing relationship between μd (dynamic friction) and applied force as well as the changing relationship between μ-initial, μd, and μ0 (200 rpm). Desired lubricants herein have a minimum average dynamic friction (μd) of about 0.128 (average of μd at 1400 rpm and with μ0/μd<1.0), a minimum friction durability of at least about 8000 cycles with μ0/μd<1.0, and FZG anti-wear weight loss of no more than about 30 mg using ASTM D4998.

The lubricants may also include other optional additives as needed for particular applications as long as the optional components do not affect the basic features of the dispersants and detergents noted above. Several common optional additives are noted herein.

Optional Additive Components

In addition to the base oils, dispersants, and detergents set forth above, the automatic transmission lubricating compositions herein may also include other additives to perform one or more functions required of a lubricating fluid. Further, one or more of the mentioned additives may be multi-functional and provide other functions in addition to or other than the function prescribed herein.

For example, the compositions herein may include one or more of at least one component selected from the group consisting of a friction modifier, an air expulsion additive, an antioxidant, a corrosion inhibitor, a foam inhibitor, a seal-swell agent, a viscosity index improver, anti-rust agent, extreme pressure additives, and combinations thereof. Other performance additives may also include, in addition to those specified above, one or more of metal deactivators, ashless TBN boosters, demulsifiers, emulsifiers, pour point depressants, and mixtures thereof. Typically, fully-formulated lubricating oils will contain one or more of these performance additives. Examples of some common optional additive components are set forth below.

Friction Modifiers

The lubricating oil compositions herein may also optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanidines, alkanolamides, phosphonates, metal-containing compounds, glycerol esters, sulfurized fatty compounds and olefins, sunflower oil and other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In a embodiments the friction modifier may be a long chain fatty acid ester. In an embodiment the long chain fatty acid ester may be a mono-ester, or a di-ester, or a (tri)glyceride. The friction modifier may be a long chain fatty amide, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291.

Antioxidants

The lubricating oil compositions herein also may optionally contain one or more antioxidants. Antioxidant compounds are known and include, for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidants may be used alone or in combination.

Corrosion Inhibitors

The automatic transmission lubricants may further include additional corrosion inhibitors (it should be noted that some of the other mentioned components may also have copper corrosion inhibition properties). Suitable additional inhibitors of copper corrosion include ether amines, polyethoxylated compounds such as ethoxylated amines and ethoxylated alcohols, imidazolines, monoalkyl and dialkyl thiadiazole, and the like Thiazoles, triazoles and thiadiazoles may also be used in the lubricants. Examples include benzotriazole; tolyltriazole; octyltriazole; decyltriazole; dodecyltriazole; 2-mercaptobenzothiazole; 2,5-dimercapto-1,3,4-thiadiazole; 2-mercapto-5-hydrocarbylthio-1,3,4-thiadiazoles; and 2-mercapto-5-hydrocarbyldithio-1,3,4-thiadiazoles. The preferred compounds are the 1,3,4-thiadiazoles, especially the 2-hydrocarbyldithio-5-mercapto-1,4-dithiadiazoles, a number of which are available as articles of commerce.

Foam Inhibitors/Anti Foam Agents

Anti-foam/Surfactant agents may also be included in a fluid according to the present invention. Various agents are known for such use. Especially preferred are copolymers of ethyl acrylate and hexyl ethyl acrylate, such as PC-1244, available from Solutia. Preferred are silicone fluids, such as 4% DCF. Mixtures of anti-foam agents are especially preferred.

Seal-Swell Agents

The automatic transmission fluids of the present disclosure may further include seal swell agents. Seal swell agents such as esters, adipates, sebacates, azealates, phthalates, sulfones, alcohols, alkylbenzenes, substituted sulfolanes, aromatics, or mineral oils cause swelling of elastomeric materials used as seals in engines and automatic transmissions.

Alcohol-type seal swell agents are generally low volatility linear alkyl alcohols, such as decyl alcohol, tridecyl alcohol and tetradecyl alcohol. Aikylbenzenes useful as seal swell agents include dodecylbenzenes, tetradecylbenzenes, dinonyl-benzenes, di(2-ethylhexyl)benzene, and the like. Substituted sulfolanes (e.g. those described in U.S. Pat. No. 4,029,588, incorporated herein by reference) are likewise useful as seal swell agents in compositions according to the present invention. Mineral oils useful as seal swell agents in the present invention include low viscosity mineral oils with high naphthenic or aromatic content. Aromatic seal swell agents include the commercially available Exxon Aromatic 200 ND seal swell agent. Commercially available examples of mineral oil seal swell agents include Exxon® Necton®-37 (FN 1380) and Exxon® Mineral Seal Oil (FN 3200).

Viscosity Modifiers

The lubricating oil compositions herein also may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 2012/0101017 A1.

The lubricating oil compositions herein also may optionally contain one or more dispersant viscosity index improvers in addition to a viscosity index improver or in lieu of a viscosity index improver. Suitable dispersant viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

Anti-Rust Agents

Various known anti-rust agents or additives are known for use in transmission fluids, and are suitable for use in the fluids according to the present disclosure. Especially preferred are alkyl polyoxyalkylene ethers, such as Mazawet® 77, C-8 acids such as Neofat® 8, oxyalkyl amines such as Tomah PA-14, 3-decyloxypropylamine, and polyoxypropylene-polyoxyethylene block copolymers such as Pluronic® L-81.

Extreme Pressure Agents

The lubricating oil compositions herein also may optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated waxes; organic sulfides and polysulfides such as dibenzyldisulfide, bis(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

Based on the above discussion, exemplary ranges of various lubricating composition components are set forth in Table 1 below.

TABLE 1

Transmission Lubricant Composition

| Component | Example Ranges, Weight Percent | Additional Example Ranges, Weight Percent |
|---|---|---|
| Dispersants | 4.5 to 25 | 4.5 to 12 |
| Detergents | 0.01 to 1 | 0.08 to 0.4 |
| Friction Modifiers | 0 to 6 | 0.005 to 4 |
| Viscosity Modifiers | 0 to 20 | 0 to 15 |
| Antioxidants | 0 to 2 | 0.05 to 1 |
| Rust inhibitors | 0 to 1 | 0.005 to 0.5 |
| Corrosion Inhibitors | 0 to 1.2 | 0.005 to 0.8 |
| Anti-wear agents | 0 to 5 | 0 to 3 |
| Seal Swell Agents | 0 to 20 | 0 to 10 |
| Antifoam Agents | 0 to 1 | 0.005 to 0.8 |
| Extreme pressure agents | 0 to 2 | 0 to 1 |
| Lubricating Base Oils | Balance | Balance |

The lubricants herein are particularly suited for dual clutch transmissions, such as those with a wet friction clutch. Suitable wet friction clutch transmissions typically have a plurality of clutch plates (may be at least three and may be up to six), such as those with a cellulose based friction lining and each having an associated steel reaction plate packed together in a housing between an application piston and a release spring. Such transmission may also include other common components such as a waved or cushion plates, spacer plates, and/or retention rings. The wet friction clutch is operated in a conventional manner by the selected application of fluid pressure using the lubricating transmissions fluid herein.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight.

EXAMPLES

Example 1

Exemplary inventive and comparative lubricants were prepared to demonstrate the criticality of the dispersant treat rates, PIB molecular weights, boron levels, ratios of boron to phosphorus, and ratios of boron to nitrogen to demonstrate that varying such dispersant characteristics leads to unacceptable friction durability or wear rate. A lubricant was prepared including a boronated and phosphorylated N-substituted polyisobutylene succinimide dispersant with the characteristics as set forth in Tables 2A and 2B below and blended conventional lubricant additives as set forth in Table 1. The dispersant included tetra ethylene penta amine (TEPA) as the substituent between the succinimide moieties.

TABLE 2A

| | Inventive Dispersants | | | |
|---|---|---|---|---|
| | I1 | I2 | I3 | I4 |
| Molecular weight of PIB | 2300 | 2300 | 2300 | 2300 |
| N in dispersant, % | 0.76 | 0.77 | 0.77 | 0.77 |
| Dispersant Treat rate, % | 7.7 | 7.7 | 23.1 | 4.5 |
| N from Dispersant, ppm | 585 | 593 | 1779 | 347 |
| Boron in Dispersant, % | 0.07 | 0.15 | 0.15 | 0.15 |
| P in Dispersant, % | 0.33 | 0.35 | 0.35 | 0.35 |
| B/P weight ratio | 0.21 | 0.43 | 0.43 | 0.43 |
| B/N weight ratio | 0.09 | 0.19 | 0.19 | 0.19 |
| B in finished fluid, ppm | 58 | 124 | 371 | 72 |

TABLE 2B

| | Comparative Dispersants | | | | | | |
|---|---|---|---|---|---|---|---|
| | C1 | C2 | C3 | C4 | C5 | C6 | C7 |
| Molecular weight of PIB | 2300 | 1300 | 950 | 950 | 2300 | 2300 | 1300 |
| N in dispersant, % | 0.77 | 1.45 | 1.64 | 1.64 | 0.75 | 0.78 | 1.45 |
| Dispersant Treat rate, % | 2.567 | 4.09 | 1.85 | 3.7 | 7.7 | 7.7 | 0.89 |
| N from Dispersant, ppm | 198 | 593 | 303 | 607 | 578 | 601 | 129 |
| Boron in Dispersant, % | 0.15 | 1.3 | 0.35 | 0.35 | 0 | 0.44 | 1.3 |
| P in Dispersant, % | 0.35 | 0 | 0.76 | 0.76 | 0.33 | 0.34 | 0 |
| B/P weight ratio | 0.43 | — | 0.46 | 0.46 | 0 | 1.29 | — |
| B/N weight ratio | 0.19 | 0.90 | 0.21 | 0.21 | 0.00 | 0.56 | 0.90 |
| B in finished fluid, ppm | 44 | 557 | 70 | 130 | 0 | 395 | 111 |

In Tables 2A and 2B, molecular weight is the number average molecular weight of the PIB substituent using gel permeation chromatography (GPC) with polystyrene (number average molecular weight of 180 to 18,000) as the reference. N refers to nitrogen, P refers to phosphorous, and B refers to Boron. The detergent in this Example was a linear sulfonate having a TBN of 307, about 11.9 weight percent metal, and 25 weight percent soap, which provided about 93 ppm metal to the finished fluid and about 0.02 percent soap to the finished fluid.

Each of the transmission lubricants of Tables 2A and 2B also included the same amounts and the same detergents, friction modifiers, a viscosity modifier, an antioxidant, rust inhibitor, corrosion inhibitor, a seal swell agent, antifoam agents, extreme pressure agent, and lubricating oils. The amounts of these additional components were as set forth in Table 1 above. Thus, the only variation between the oils of Tables 2A and 2B was the dispersant features as set forth in those Tables.

Table 3 below provides the friction and anti-wear test results of the various inventive and comparative lubricants of Tables 2A and 2B. Anti-wear characteristics are determined using an FZG anti-wear test according to ASTM D 4998. Friction properties are determined using a modified JASO M348:2002 test using a SAE#2 wet friction rig and the process described below. Acceptable lubricants for automatic transmissions, and in particular, dual clutch transmissions, require no more than about 30 mg of weight loss using the FZG anti-wear test and a friction durability of at least 8000 cycles with $\mu 0/\mu d<1.0$ ($\mu 0$ is friction at 200 rpm and $\mu d$ is friction at 1400) and a minimum average dynamic friction at 1400 rpm of 0.128 before $\mu 0/\mu d>1.0$. Inventive lubricants passed all three performance criteria. Comparative lubricants failed one or more of these tests. Comparative samples C1 and C7 were not further tested for friction durability because the anti-wear results were almost double the desired minimum. Failures are highlighted in the Table below.

TABLE 3

Test Results

| Lubricant | Anti-Wear mg | Friction Durability, cycles with $\mu 0/\mu d <1.0$ | Average Dynamic Friction, 1400 rpm |
|---|---|---|---|
| I1 | 2 | 9200 | 0.134 |
| I2 | 11 | >10,000 | 0.135 |
| I3 | 5 | >10,000 | 0.145 |
| I4 | 13 | >10,000 | 0.131 |
| C1 | 54 | — | — |
| C2 | 28 | 1225 | 0.12 |
| C3 | 10 | >10,000 | 0.122 |
| C4 | 16 | >10,000 | 0.125 |
| C5 | 9 | 2400 | 0.128 |
| C6 | 41 | 3150 | 0.116 |
| C7 | 56 | — | — |

As shown in Tables 2A, 2B, and 3 above, even a small deviation in one or more of dispersant treat rates, PIB molecular weight, boron levels, boron to phosphorous ratio, or boron to nitrogen ratio results in one or more of the desired lubricant parameters failing thereby rendering the lubricant unsuitable for automatic transmissions, and in particular, dual clutch transmissions.

Test Conditions

Figure 1:
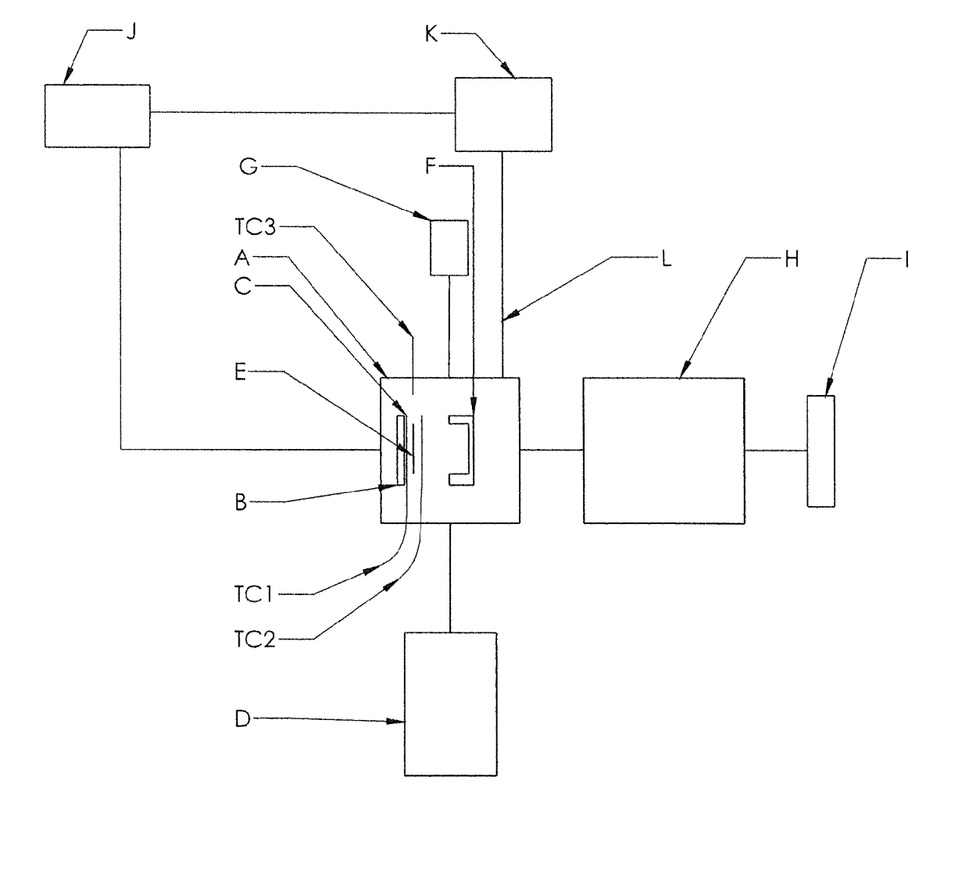
FIG. 1 is a schematic of an exemplary test rig for evaluating friction properties of the lubricants herein.

The test procedure is a modified version of JASO M348: 2002 that measures friction durability utilizing a SAE No. 2 wet friction rig to evaluate the durability of a clutch system. FIG. 1 depicts, in schematic fashion, an exemplary SAE No. 2 machine used for the testing herein.

In FIG. 1, a SAE No. 2 combination wet-friction rig includes a high speed AC motor H with shaft extensions on both ends. The inertia end is flanged to a flywheel J to provide the desired total energy for each dynamic engagement. The clutch end (B, C and E) extends into the test head A where it is adapted to drive the splined hub for the clutch (B and C). The Test Head A, is supported on the shaft through bearings to allow rotation independent of the shaft. Frictional force is measured through a load cell G at a given temperature, load, and sliding speed. The load is applied by means of a pneumatic piston F. The particular test oil under evaluation is circulated by pump J from the bottom of the Test Head A, though heat exchanger K, by means of hoses L, returning to the Test Head A through the hollow drive shaft to be sprayed through holes in the splined hub for the clutch.

The dimensions of the friction disk E, loaded between the two steel plates C, are as follows: Material Type: Borg Warner 6100; Groove: Parallel (grooves fully parallel at approx. 20% area); Inner Diameter (Di) 120.5 mm; Outer Diameter (Do) 146.0 mm; Effective Mean Radius (Rm) 66.8 mm; Gross Area [per side, ungrooved] (AG) 5,337 mm2.

Industry standard steel separator plates are used as the mating plates. Each of the two steel plates are drilled radially with 0.61 mm holes with an outer edge chamfered to a depth at the Effective Mean Radius of the steel separator plate. A type J thermocouple was inserted in each plate so that the tip of the thermocouple was positioned at the bottom of the bore. The steel separator plates were cleaned with heptane. Plates were soaked in the tested lubricant for fifteen (15) minutes and assembled in the SAE No. 2 head with the rotating friction disk located between the fixed steel plates (Note the FIGURE). Oil temperature Thermocouple TC3 is installed 1 mm from the outside of the steel separator plates at the 7 o'clock position in the test head A. Spacer B is installed to give 0.8±0.2 mm of clutch pack clearance. The test oil circulation pump J, heat exchanger K and hoses L are cleaned by flushing 1 L of unadditized base stock oil through them. After the base oil flush, 500 ml of test lubricant is flushed through the same. The hoses L are connected to the test head A and 1 L of test oil was charged into the head assembly through the ATF reservoir. Flywheels I are installed on the rig to give a total inertia of 1.27 kg*m².

To conduct the evaluation, the test oil circulation pump J is set to flow about 4.5±0.5 L/min. With no load applied to the clutch and the motor H running at 100 rpm, the test oil is heated to 60±3° C. When the oil temperature has stabilized, the test begins 20,000 sequential dynamic engagements whose conditions are described in Table 4. The test begins with an applied load of 0.76 MPa and adjusts apply load to control stop time. Data is collected for each test cycle. The values for friction ($\mu$), are calculated for each cycle and used to determine the performance and durability of the clutch system.

TABLE 4

| Test Conditions: | |
|---|---|
| Test Oil Temperature | 90 ± 3° C. |
| Stabilization Period, $T_1$ | AC Motor ramps to 2800 ± 20 rpm and stabilizes for 5 ± 0.5 s |
| Coast Period, $T_2$ | 0 |
| Apply Period, $T_3$ | Load is applied ± 0.5% for 5 ± 0.1 s with an apply rate of 1840 kPa/s |
| Dwell Period, $T_4$ | Load is off and speed is 0 for an additional 4 ± 0.5 s |
| Stop Time, $\phi$ | 4.0 ± 0.05 s |

Example 2

Additional exemplary inventive and comparative lubricants were prepared to demonstrate the further criticality of the metal containing detergent when combined with the selected dispersant treat rates, PIB molecular weights, boron levels, ratios of boron to phosphorus, and ratios of boron to nitrogen. This further Example demonstrates that varying metal content and soap content of the detergent is also key in maintaining acceptable friction durability and wear rate in the context of automatic transmission lubricants. A lubricant was prepared including a boronated and phosphorylated N-substituted polyisobutylene succinimide dispersant combined with neutral to overbased detergents that provide varying metal amounts and soap content to the final lubricant. As shown by the results below in Table 6 (failures highlighted), the detergent needs to provide to the lubricant a metal content of less than 455 ppm and a soap content of 0.02 to about 0.15 percent in order to achieve desirable results.

Each of the transmission lubricants of Table 5A (inventive) and 5B (comparative) below also included the same amounts and same dispersant, friction modifiers, a viscosity modifier, an antioxidant, rust inhibitor, corrosion inhibitor, a seal swell agent, antifoam agents, extreme pressure agent, and lubricating oils. The amounts of these additional components were as set forth in Table 1 above. Thus, the only variation between the oils of Tables 5A and 5B were the detergent features as set forth in those tables. The dispersant used in this Example has a number average molecular weight of the PIB substituent of 2300, about 0.77 weight percent nitrogen, about 593 ppm nitrogen, about 0.15 weight percent boron, about 0.35 weight percent phosphorus, a boron to phosphorus ratio of 0.43, a ratio of boron to nitrogen of 0.19, and about 124 ppm of boron in the finished fluid.

TABLE 5A

Inventive Detergents

|  | I5 | I6 | I7 | I8 | I9 |
|---|---|---|---|---|---|
| Detergent type | Linear Sulfonate | Linear, Sulfonate | Sulfonate | Phenate | Branched Sulfonate |
| TBN of Detergent | 307 | 307 | 27.5 | 230 | 300 |
| Detergent Treat rate, % | 0.08 | 0.24 | 0.37 | 0.103 | 0.083 |
| Metal in Detergent, % | 11.9 | 11.9 | 2.6 | 9.25 | 11.6 |
| Metal in finished fluid, ppm | 93 | 281 | 105 | 96 | 97 |
| Soap content in detergent, % | 25 | 25 | 40 | 33 | 29 |
| Soap content in finished fluid, % | 0.02 | 0.06 | 0.15 | 0.03 | 0.02 |

TABLE 5B

Comparative Detergents

|  | C8 | C9 | C10 | C11 |
|---|---|---|---|---|
| Detergent type | None | Sulfonate | Sulfonate | Sulfonate |
| TBN of Detergent | — | 307 | 307 | 307 |
| Detergent Treat rate, % | 0 | 0.4 | 0.6 | 0.8 |
| Metal in Detergent, % | 0 | 11.9 | 11.9 | 11.9 |
| Metal in finished fluid, ppm | 0 | 455 | 682.5 | 942 |
| Soap content in detergent, % | 0 | 25 | 25 | 25 |
| Soap content in finished fluid, % | 0 | 0.1 | 0.15 | 0.2 |

Table 6 below shows results of the anti-wear and friction durability tests determined using the same procedures as Example 1 above. Comparative sample C11 was not tested for friction durability in view of the anti-wear results being almost double the desired minimum. The results demonstrate the criticality of metal content and soap content provided by the detergent in the final lubricant on the desired lubricant properties. Deviation of either factor results in one or more of the key lubricant performance criteria failing.

TABLE 6

Detergent Results

| Lubricant | Anti-Wear mg | Friction Durability, cycles with μ0/μd <1.0 | Average Dynamic Friction, 1400 rpm |
|---|---|---|---|
| I5 | 11 | >10,000 | 0.135 |
| I6 | 15 | >10,000 | 0.131 |
| I7 | 27 | >10,000 | 0.129 |
| I8 | 28 | >10,000 | 0.132 |
| I9 | 10 | >10,000 | 0.133 |
| C8 | 14 | 8950 | 0.123 |
| C9 | 8 | >10,000 | 0.123 |
| C10 | 15 | >10,000 | 0.126 |
| C11 | 70 | — | — |

Example 3

Another experiment was conducted to determine if the level of sulfur in a thiadiazole corrosion inhibitor further affected lubricant properties. Table 7 identifies a lubricant that varies the level of a thiadizole containing corrosion inhibitor. In the tested lubricants of Table 7, each composition evaluated included the same amounts and the same dispersant, detergent, friction modifiers, a viscosity modifier, an antioxidant, rust inhibitor, a seal swell agent, antifoam agents, extreme pressure agent, and base lubricating oils. The amounts of these other components are as set forth in Table 1. The dispersant used in these Examples was described in Example 2 and the detergent was described in Example 1. Thus, the only variation between the lubricants of Table 7 was the corrosion inhibitor amounts, and accordingly, the level of sulfur in the tested lubricants. As shown by the test results, all lubricants of Table 7 passed the friction and anti-wear testing (conducted consistent with Example 1), which indicates that the levels of sulfur provided by the corrosion inhibitor did not impact the results. It is expected similar results would be achieved with corrosion inhibitor treat rates of less than about 1% and, in particular, about 0.005% to about 0.5% corrosion inhibitor treat rates.

TABLE 7

Corrosion Inhibitor

| | Fluid | | | |
|---|---|---|---|---|
| | I10 | I11 | I12 | I13 |
| Dispersant, % | 7.7 | 7.7 | 7.7 | 7.7 |
| Detergent, % | 0.08 | 0.08 | 0.08 | 0.08 |
| Corrosion Inhibitor, treat rate, % | 0.16 | 0.32 | 0.48 | 0.005 |
| Sulfur in Corrosion inhibitor, % | 35 | 35 | 35 | 35 |
| Average Dynamic Friction, 1400 rpm | 0.135 | 0.129 | 0.13 | — |
| Friction Durability, cycles with μ0/μd <1.0 | >10,000 | 8925 | >10,000 | — |
| FZG Anti-Wear, Weight Loss, mg | 11 | 12 | 19 | 26 |

It will be understood that various changes in the details, materials, and arrangements of formulations and ingredients, which have been herein described and illustrated in order to explain the nature of the method, compositions, and transmissions, may be made by those skilled in the art within the principle and scope of the description and claims herein.

What is claimed is:

1. A transmission lubricant composition comprising:
a major amount of a lubricating oil;
4.5 to 23 weight percent of a boronated and phosphorylated N-substituted polyisobutylene succinimide dispersant having a number average molecular weight of the polyisobutylene substituent greater than 1300 to 2300 as determined by gel permeation chromatography using polystyrene as the reference and a viscosity of the polyisobutylene at 100° C. of 2100 to 2700 cSt, a ratio of boron to phosphorus of 0.21 to 0.46, and a ratio of boron to nitrogen of 0.09 to 0.19, and an amount of boron to provide 58 to 371 ppm boron to the transmission lubricant composition; and
a metal containing detergent providing metal at greater than 0 ppm and up to 281 ppm to the transmission lubricant composition and delivering a soap content of 0.02 to 0.15 weight percent to the transmission lubricant composition.

2. The composition of claim 1, wherein the transmission lubricant composition has a Brookfield viscosity at −40° C. of not more than 15,000 cP.

3. The composition of claim 1, wherein the major amount of a lubricating oil is selected from the group consisting of a Group II base oil, a Group III base oil and/or a Group IV base oil as well as mixtures thereof.

4. The composition of claim 1, wherein the transmission lubricant composition includes 4.5 to 7.7 weight percent of the boronated and phosphorylated N-substituted polyisobutylene succinimide dispersant.

5. The composition of claim 1, wherein the metal containing detergent is a neutral to overbased sulfonate, phenate, or carboxylate with an alkali metal or alkaline earth metal salt.

6. The composition of claim 5, wherein the metal containing detergent is a linear or branched sulfonate.

7. The composition of claim 1, further comprising 0.08 to 1 weight percent of the metal containing detergent.

8. The composition of claim 1, wherein the metal containing detergent is not boronated.

9. The composition of claim 1, further comprising at least one component selected from the group consisting of a friction modifier, an air expulsion additive, an antioxidant, a corrosion inhibitor, a foam inhibitor, a seal-swell agent, a viscosity index improver, anti-rust agent, an extreme pressure additive, and mixtures thereof.

10. A method of lubricating a machine part comprising supplying thereto a lubricant composition, the method comprising:
lubricating a machine part with a lubricant composition, the lubricant composition including a mixture of
a major amount of a lubricating oil;
4.5 to 23 weight percent of a boronated and phosphorylated N-substituted polyisobutylene succinimide dispersant having a number average molecular weight of the polyisobutylene substituent greater than 1300 to 2300 as determined by gel permeation chromatography using polystyrene as the reference and a viscosity of the polyisobutylene at 100° C. of 2100 to 2700 cST, a ratio of boron to phosphorus of 0.21 to 0.46, and a ratio of boron to nitrogen of 0.09 to 0.19, and an amount of boron to provide 58 to 371 ppm boron to the lubricant composition; and
a metal containing detergent providing metal at greater than 0 ppm and up to 281 ppm to the lubricant composition and delivering a soap content of 0.02 to 0.15 weight percent to the lubricant composition.

11. The method of claim 10, wherein the lubricant composition has a Brookfield viscosity at −40° C. of not more than 15,000 cP.

12. The method of claim 10, wherein the major amount of a lubricating oil is selected from the group consisting of a Group II base oil, a Group III base oil and/or a Group IV base oil as well as mixtures thereof.

13. The method of claim 10, wherein the lubricant composition includes 4.5 to 7.7 weight percent of the boronated and phosphorylated N-substituted polyisobutylene succinimide dispersant.

14. The method of claim 10, wherein the metal containing detergent is a neutral to overbased sulfonate, phenate, or carboxylate with an alkali metal or alkaline earth metal salt.

15. The method of claim 14, wherein the metal containing detergent is a linear or branched sulfonate.

16. The method of claim 10, further comprising 0.08 to 1 weight percent of the metal containing detergent.

17. The method of claim 10, wherein the metal containing detergent is not boronated.

18. The method of claim 10, wherein the lubricant composition further includes at least one component selected from the group consisting of a friction modifier, an air expulsion additive, an antioxidant, a corrosion inhibitor, a foam inhibitor, a seal-swell agent, a viscosity index improver, anti-rust agent, an extreme pressure additive, and mixtures thereof.

* * * * *